United States Patent
Mayle et al.

(10) Patent No.: US 10,837,816 B2
(45) Date of Patent: Nov. 17, 2020

(54) ULTRASONIC TIME OF FLIGHT FLOW MEASURING DEVICE AND METHOD

(71) Applicant: DIEHL METERING GMBH, Ansbach (DE)

(72) Inventors: Michael Mayle, Ansbach (DE); Peter Ploss, Bayreuth (DE); Andreas Benkert, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/537,803

(22) Filed: Aug. 12, 2019

(65) Prior Publication Data
US 2020/0049544 A1   Feb. 13, 2020

(30) Foreign Application Priority Data

Aug. 11, 2018 (DE) .................. 10 2018 006 381

(51) Int. Cl.
| | |
|---|---|
| G01F 1/86 | (2006.01) |
| G01F 1/66 | (2006.01) |
| G01N 9/24 | (2006.01) |
| G01N 11/00 | (2006.01) |

(52) U.S. Cl.
CPC ............... *G01F 1/86* (2013.01); *G01F 1/667* (2013.01); *G01N 9/24* (2013.01); *G01N 2011/0073* (2013.01)

(58) Field of Classification Search
None
See application file for complete search history.

(56) References Cited

U.S. PATENT DOCUMENTS

| | | | | |
|---|---|---|---|---|
| 3,575,050 A | * | 4/1971 | Lynnworth | G01F 1/66 73/861.27 |
| 4,280,365 A | * | 7/1981 | Connery | G01F 1/663 367/90 |
| 4,838,127 A | | 6/1989 | Herremans et al. | |
| 5,280,728 A | * | 1/1994 | Sato | G01F 1/667 73/861.28 |

(Continued)

FOREIGN PATENT DOCUMENTS

| | | |
|---|---|---|
| AU | 2010335057 A1 | 7/2012 |
| DE | 4422367 C1 | 2/1996 |

(Continued)

*Primary Examiner* — Harshad R Patel
(74) *Attorney, Agent, or Firm* — Laurence A. Greenberg; Werner H. Stemer; Ralph E. Locher

(57) ABSTRACT

A method for operating a measuring device determining a fluid quantity relating to fluid or fluid flow uses a measuring tube receiving the fluid or conducting the flow and oscillation transducers spaced along the tube. A first flight time is recorded, then an ultrasound signal excited by a first transducer, after travel on a propagation path including only components of the measuring device to a second transducer, is recorded at a second transducer. A second flight time is recorded, then an ultrasound signal excited by the second transducer, after travel on the propagation path to the first transducer, is recorded at the first transducer. Then fulfillment of a report condition depending on a difference between flight times is checked. Upon fulfillment, a report is output to a user or a report message is sent to an external device or a correction parameter for determining the fluid quantity is adapted.

10 Claims, 2 Drawing Sheets

(56) References Cited

U.S. PATENT DOCUMENTS

| | | | |
|---|---|---|---|
| 2009/0000394 A1* | 1/2009 | Opitz | G01F 1/667 |
| | | | 73/861.27 |
| 2011/0094309 A1 | 4/2011 | Berger et al. | |
| 2011/0271769 A1* | 11/2011 | Kippersund | G01F 1/42 |
| | | | 73/861.28 |
| 2015/0292926 A1 | 10/2015 | Takemura et al. | |
| 2016/0153816 A1* | 6/2016 | Hayashi | G01F 1/662 |
| | | | 73/861.29 |
| 2016/0320219 A1* | 11/2016 | Hellevang | G01F 1/663 |
| 2019/0257679 A1 | 8/2019 | Wiest et al. | |

FOREIGN PATENT DOCUMENTS

| | | |
|---|---|---|
| DE | 102008029772 A1 | 12/2009 |
| DE | 102016119910 A1 | 4/2018 |
| EP | 0264991 A1 | 4/1988 |

* cited by examiner

US 10,837,816 B2

ULTRASONIC TIME OF FLIGHT FLOW MEASURING DEVICE AND METHOD

CROSS-REFERENCE TO RELATED APPLICATION

This application claims the priority, under 35 U.S.C. § 119, of German application DE 10 2018 006 381.0, filed Aug. 11, 2018; the prior application is herewith incorporated by reference in its entirety.

BACKGROUND OF THE INVENTION

Field of the Invention

The invention relates to a method for operating a measuring device which is used in order to determine a fluid quantity relating to a fluid and/or a fluid flow of the fluid and includes a measuring tube, which receives the fluid and/or through which the fluid can flow, and first and second oscillation transducers which are disposed at a distance from one another along the measuring tube. The invention furthermore relates to a measuring device.

One possibility for measuring a flow or other measurement quantities relating to a fluid involves ultrasonic meters. In those, at least one ultrasound transducer is used in order to introduce an ultrasound wave into the fluid flowing through the measuring tube, that wave being conducted on a straight path or after multiple reflections at walls or special reflection elements to a second ultrasound transducer. A flow speed through the measuring tube can be determined from a time-of-flight difference between the times of flight of the ultrasound wave between the ultrasound transducers when interchanging the transmitter and the receiver.

Due to production tolerances of the components of the measuring device, in particular of oscillation transducers which are used, or the electronics controlling them, however, in that case a time-of-flight difference is typically measured even when the fluid is at rest in the measuring tube, which results in a so-called zero-flow error. That zero-flow error is typically determined during calibration of the measuring device after production and permanently stored in it in order to make it possible to determine a corrected flow rate. A problem in that case is that the zero-flow error may vary because of ageing of the components of the measuring device. That problem is typically avoided by replacing the entire measuring device, or the relevant components of the measuring device, before a corresponding error becomes too great. That, however, may lead to unnecessary early replacement of the meters, and therefore to unnecessary costs and unnecessary resource consumption.

As an alternative, for example, it is proposed in German Patent DE 44 22 367 C1 to measure the zero-flow error repeatedly during operation, with a separate measurement channel with static fluid being used for that purpose in that patent. That, however, leads to an increase in the complexity of the measuring device and the installation space taken up by it. Furthermore, depending on the specific construction, such a continuous correction of the zero-flow error may open up potential possibilities for manipulation, and may therefore be problematic in relation to authorization of the measuring device for certain measurement tasks.

SUMMARY OF THE INVENTION

It is accordingly an object of the invention to provide a method for operating a measuring device and a measuring device for determining a fluid quantity, which overcome the hereinafore-mentioned disadvantages of the heretofore-known methods and devices of this general type and which in particular make it possible to avoid unnecessary replacement of the device, or of its components, despite a simple technical configuration of the measuring device.

With the foregoing and other objects in view there is provided, in accordance with the invention, a method for operating a measuring device which is used in order to determine a fluid quantity relating to a fluid and/or a fluid flow of the fluid and includes a measuring tube, which receives the fluid and/or through which the fluid can flow, and a first and a second oscillation transducer which are disposed at a distance from one another on the measuring tube, wherein a first time of flight is recorded, after which an ultrasound signal which is excited by the first oscillation transducer, after it has been conducted along a propagation path which includes only components of the measuring device to the second oscillation transducer, is recorded at the second oscillation transducer, and a second time of flight is recorded, after which an ultrasound signal which is excited by the second oscillation transducer, after it has been conducted along the propagation path to the first oscillation transducer, is recorded at the first oscillation transducer, after which a check is made as to whether a report condition is fulfilled, the fulfillment of which depends on the time-of-flight difference between the first and second times of flight, and if the report condition is fulfilled, a report is output to a user and/or a report message is sent to an external device and/or at least one correction parameter, which is used in the scope of determining the fluid quantity, is adapted.

In the scope of the method according to the invention, times of flight for the ultrasound signals are determined along a propagation path which extends only through components of the measuring device. In particular, the ultrasound signal may in this case be conducted through the side wall of the measuring tube. Furthermore, the propagation path may include coupling elements which are disposed between the respective oscillation transducer and the side wall of the measuring tube. As will be explained in more detail below, in this case it is possible for the ultrasound signal additionally to be conducted over a further propagation path through the fluid to the other oscillation transducer. In this case, however, it is typically readily possible to distinguish on the reception side between the ultrasound signal conducted only through components of the measuring device and the ultrasound signal conducted through the fluid, since the time-of-flight difference between the times of flight for these two propagation paths may be significantly greater than the duration of the emission of the ultrasound signal.

Since the first and second times of flight are times of flight for signal propagation only through components of the measuring device, i.e. not through the fluid, the time-of-flight difference determined is substantially independent of a flow speed of the fluid in the measuring device, and is therefore primarily caused by the time-of-flight difference, described in the introduction, for the propagation directions due to component tolerances, or because of ageing of the individual components. The time-of-flight difference determined may therefore be a measure for a zero-flow error occurring in the current operating state of the measuring device. As will be explained in more detail below, the report condition may, in particular, be fulfilled when the time-of-flight difference deviates greatly from a reference value, i.e. in particular when there is a significantly different zero-flow error than would be expected on the basis of the reference value, i.e. for example on the basis of calibration by the manufacturer. This may indicate a change in the behavior of the components of the measuring device because of ageing, or because of other malfunctions which may influence a zero-flow error.

In the event that the report condition is fulfilled, according to the invention a report may be output to a user or a report message may be sent to an external device. A provider or end customer, or another user of the measuring device, may therefore be informed that the measuring device should be serviced or replaced in order to avoid future measurement errors, for example due to an erroneous determination of a continuous flow. Reporting to a user may, for example, be carried out by using a display, a loudspeaker, a lamp, for example a light-emitting diode, or the like. The output may, in particular, be carried out only when the report condition is fulfilled. For example, a warning symbol or a particular message may be represented on a display. In the case of a loudspeaker, a warning sound, a voice message or the like may be output. Lamps may, for example, shine continuously, flash, or flash with a particular flashing pattern, when the report condition is fulfilled.

Transmission of the report message may for example be carried out to a central device of a supplier, a mobile phone of an end user or a service employee who can carry out servicing, or the like. Conventional communication protocols may be used for the message transmission, for example mobile-phone protocols such as GPRS or SMS, but also W-LAN, Bluetooth® or the like, preferably also protocols from the smart-home or IoT (Internet of Things) sector, such as ZigBee®, Z-Wave®, NB-IoT, LoRa® or SigFox®.

If, for example, ageing of components of the measuring device only leads to a minor variation of the time-of-flight difference, under certain circumstances it may be unnecessary to replace or service the measuring device. It may also be desirable to improve the measurement accuracy until servicing or replacement of the measuring device can be carried out. In the event that the report condition is fulfilled, a correction parameter, which is used in the scope of determining the fluid quantity, may therefore also be adapted. This may, for example, be an offset which is used in the scope of determining a flow.

The described measures make it possible, with little technical outlay, to inform a user or a supplier if a change in the zero-flow error is to be expected because of ageing or other defects of the measuring device, so that servicing or replacement of the measuring device may be expedient. Furthermore, a correction parameter may be adapted if need be. The effect achievable in this way is that measuring devices may be operated over longer periods of time without servicing and/or replacement, or maybe operated in such a way that servicing or replacement is carried out, or must be carried out, only when this is actually necessary because of ageing of the components of the measuring device or defects. In this way, resource consumption and costs for use of the measuring device can be reduced.

In order to determine the fluid quantity, in the method according to the invention third and fourth times of flight between the oscillation transducers may be recorded for a propagation path in which a pressure wave, which is used for the ultrasound transmission, is excited in the fluid directly or through the wall of the measuring tube, and the fluid quantity can be determined as a function of a time-of-flight difference of these times of flight. Such a procedure is fundamentally known in the prior art and will not be explained in detail herein.

The report condition may be fulfilled, or only be fulfillable, when a deviation between the time-of-flight difference and a reference value for the time-of-flight difference exceeds or reaches a predetermined deviation limit value. The reference value for the time-of-flight difference may be specified by the manufacturer and, for example, stored on a control device of the measuring device. It may be determined in the scope of a calibration of the measuring device, in particular in the same way as the time-of-flight difference between the first and second times of light. The reference value may be measured in the scope of production, before installation of the measuring device at the place of use, after installation but without fluid in the measuring tube, or even with fluid in the measuring tube. It is, however, also possible to determine the reference value for the time of flight, for example, repeatedly after particular operating intervals or once particular conditions are fulfilled, so that the report condition may for example be fulfilled when the time-of-flight difference between the first and second times of flight changes by more than the deviation limit value over a particular time interval or between two particular operating situations. The deviation limit value may in this case also be specified as a function of the length of this time interval, for example by specifying an allowable rate of change of this time-of-flight difference.

In the method according to the invention, the temperature of the fluid and/or of at least one component of the measuring device may be recorded, with the fulfillment of the report condition additionally depending on the recorded temperature. For example, temperature sensors may be provided on particular components or protrude into the fluid. Taking the temperature into account may be advantageous since the propagation speed of the ultrasound signal in at least one component of the measuring device may be temperature-dependent. For this reason, for example, in the event of temporarily occurring high or low temperatures, deviations in the time-of-flight difference may occur which are, however, purely temperature-related and not caused by ageing or defects of the components. For example, provision may therefore be made that the report condition is fulfillable only when the recorded temperature lies in a predetermined operating temperature interval.

Particularly preferably, the reference value may be specified as a function of the recorded temperature. For example, a plurality of potential reference values may be specified, from which one is selected as a function of the temperature. It is, however, also possible to interpolate temperature-dependently between a plurality of predetermined reference values or to provide a functional relationship between the reference value and the temperature. For example, in the scope of a calibration of the measuring device, a value for the time-of-flight difference between the first and second times of flight may be determined for a plurality of temperatures in order to specify a look-up table or the like for a temperature-dependent specification of the reference value and, for example, store it in a control device of the measuring device. The use of a temperature-dependent reference value makes it possible that, during the determination of the above-explained deviation between the time-of-flight difference and the reference value, the temperature dependency of the time-of-flight difference is already taken into account by using the temperature-dependent reference value. In this way, in particular, erroneous detection of a requirement for servicing or calibration of the measuring device may be avoided.

It is possible that, repeatedly at time intervals, a respective first time of flight is recorded, after which an ultrasound signal which is excited by the first oscillation transducer, after it has been conducted along the propagation path which includes only components of the measuring device to the second oscillation transducer, is recorded at the second oscillation transducer, and a respective second time of flight is recorded, after which an ultrasound signal which is excited by the second oscillation transducer and is conducted along the propagation path to the first oscillation transducer, is recorded at the first oscillation transducer, after which a respective time-of-flight difference between the respective first and second times of flight may be determined, in which case the fulfillment of the report condition may depend on a plurality of these time-of-flight differences, in particular, on at least three of these time-of-flight differences.

In the simplest case, a first determination of the time-of-flight difference may be used in order to record the above-explained reference value, after which time-of-flight differences recorded at later instants are compared with this reference value. It is, however, also possible that time-of-flight differences respectively determined in chronological succession are considered, in particular with a difference of these time-of-flight differences being evaluated, especially while taking into account the time interval between these determinations. For example, the report condition may be fulfilled when the time-of-flight difference changes sufficiently rapidly, i.e. for example when the ratio of the difference of two time-of-flight differences and the time which elapsed between the recording of these time-of-flight differences exceeds a limit value. More robust detection of ageing or defects of a measuring device, i.e. of cases in which the report condition is intended to be fulfilled, may however be achieved when at least three or more time-of-flight differences are taken into account. For example, a best-fit line or curve which describes the time profile of the time-of-flight difference may be determined. In this case, it is also possible to use algorithms in order to detect individual outliers, i.e. highly deviating values of the time-of-flight differences, and not take them into account, or take them into account less, for example a RANSAC algorithm.

The ultrasound signal which is excited by the first oscillation transducer in order to determine the first time of flight may additionally be conducted through the fluid to the second oscillation transducer and recorded there, in order to determine a third time of flight, and the ultrasound signal which is excited by the second oscillation transducer in order to determine the second time of flight may additionally be conducted through the fluid to the first oscillation transducer and recorded there, in order to determine a fourth time of flight, with the fluid quantity being determined as a function of the time-of-flight difference between the third and fourth times of flight. The use of a time-of-flight difference of an ultrasound signal which is conducted through the fluid in order to determine a flow velocity is fundamentally known and will not be explained in detail herein. The effect achieved by the procedure described is an excitation of ultrasound signals which are required anyway in order to determine the fluid quantity and may additionally be used in order to determine the time-of-flight difference between the first and second times of flight. The method according to the invention may therefore be integrated with little outlay and with low energy consumption into existing methods for flow rate measurement. Alternatively, it would also be possible to carry out these measurements separately. For example, in order to determine the first and second times of flight, pure surface waves of the wall of the measuring tube may be excited, or Lamb waves which cannot be introduced into the fluid. In this way, under certain circumstances, an influence of the fluid on the first and second times of flight may be reduced further.

The fluid quantity may relate to a flow rate of the fluid through the measuring tube, with the report condition only being fulfillable, and/or the time-of-flight difference between the first and second times of flight only being determinable, when the fluid quantity continuously exceeds a flow-rate limit value over at least one predetermined time interval. If a continuous flow is established, or a persistent flow during unexpected times, for example at night, this may indicate a measurement error, in particular a zero-flow error, or a leak in the system conveying fluid. Since, in the method according to the invention, the time-of-flight difference between the first and second times of flight is as explained substantially independent of the fluid quantity flowing through the measuring tube, the report condition may be used in order to distinguish between the occurrence of a zero-flow error and of a leak. For example, it is therefore possible that a report is output, a report message is sent or the correction parameter is adapted only in the event of a leak or only in the event of an unexpected zero-flow error. Preferably, depending on whether a zero-flow error or a leak is involved, different reports may be output or different report messages may be sent, for example by checking different report conditions for these cases.

The or a third time of flight may be recorded after an ultrasound signal, which is excited by the first oscillation transducer and is conducted through the fluid to the second oscillation transducer, is recorded at the second oscillation transducer, and the or a fourth time of flight may be recorded after an ultrasound signal, which is excited by the second oscillation transducer and is conducted through the fluid to the first oscillation transducer, is recorded at the first oscillation transducer, with the fluid quantity being determined as a function of a corrected time-of-flight difference, which is determined by adding the correction parameter to the time-of-flight difference between the third and fourth times of flight or subtracting it therefrom. The correction parameter may therefore be used in order to compensate for time-of-flight differences which may occur because of production-related component tolerances and may cause a zero-flow error. If the correction parameter is adapted in the event that the report condition is fulfilled, it may in particular be set to the value of the time-of-flight difference between the first and second times of flight or a value dependent on this time-of-flight difference. This is advantageous since the same factors that lead to a time-of-flight difference between the third and fourth times of flight in the case of a static fluid also lead to the time-of-flight difference between the first and second times of flight.

A Lamb wave conducted in the wall of the measuring tube may be excited for determination of the fluid quantity by the first and/or second oscillation transducer, and/or the first and/or second oscillation transducers may be separated from the fluid by the wall of the measuring tube. In both cases, the pressure oscillations in the fluid are not excited directly by the oscillation transducers, but rather the latter initially excite the wall of the measuring tube into oscillations which the wall subsequently transmits to the fluid. In this way, a certain introduction of oscillation into the wall also necessarily takes place, which may be used in order to determine the first or second time of flight. The oscillation transducers may, for example, be clamped on the measuring tube. The described indirect excitation of the fluid oscillations makes it possible to implement the method according to the invention with particularly little outlay.

With the objects of the invention in view, there is concomitantly provided a measuring device for determining a fluid quantity relating to a fluid and/or a fluid flow of the fluid, comprising a measuring tube which receives the fluid and/or through which the fluid can flow, a first and a second oscillation transducer which are disposed at a distance from one another on the measuring tube, and a control device by which the first and second oscillation transducers can be driven and measurement data recorded by the first and second oscillation transducers can be evaluated, wherein the measuring device is adapted for carrying out the method according to the invention. In particular, the control device is adapted in order to drive the first and second oscillation transducers, as explained in relation to the method according to the invention, and to evaluate the measurement data recorded by the first and second oscillation transducers, as explained in relation to the method according to the invention.

Other features which are considered as characteristic for the invention are set forth in the appended claims.

Although the invention is illustrated and described herein as embodied in a method for operating a measuring device and a measuring device for determining a fluid quantity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
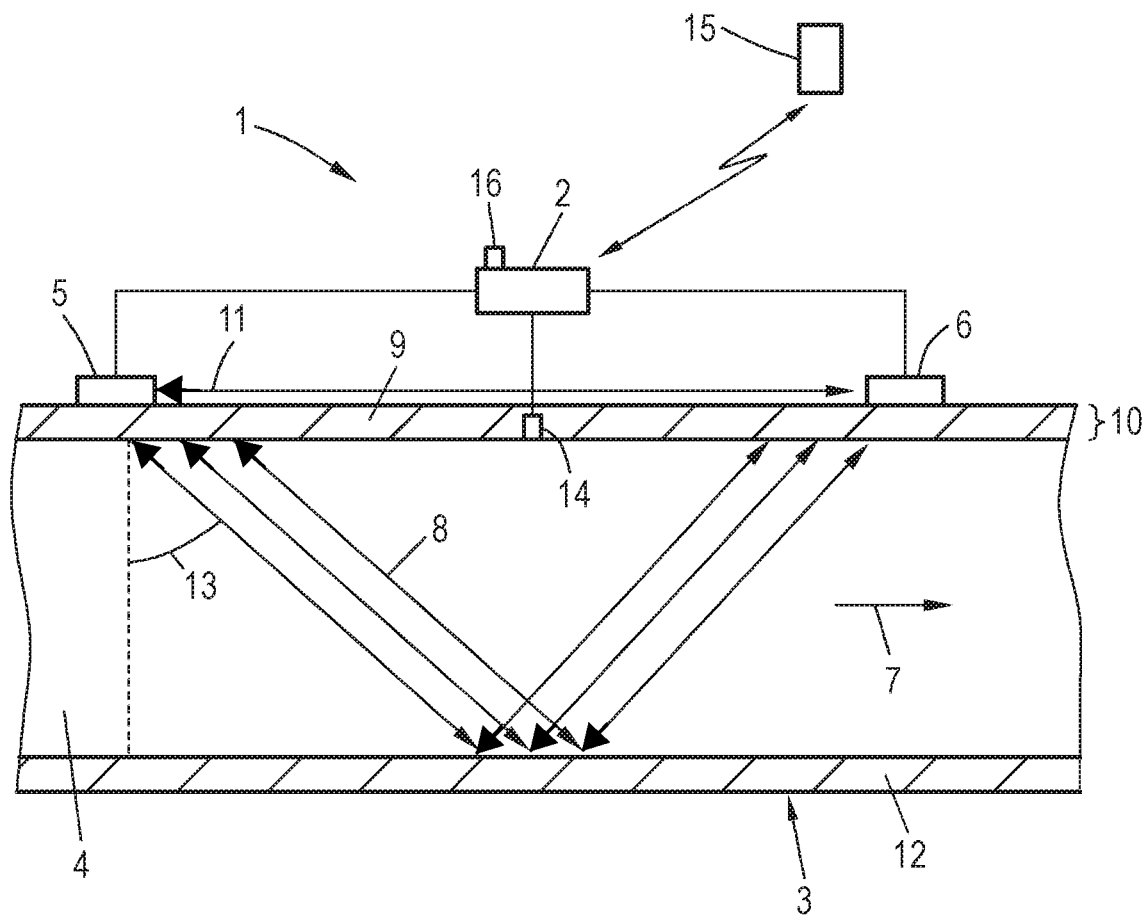
FIG. 1 is a fragmentary, diagrammatic, longitudinal-sectional view of an exemplary embodiment of a measuring device according to the invention, by which an exemplary embodiment of the method according to the invention may be carried out.

Referring now in detail to FIG. 1 of the drawing, there is seen a measuring device 1 for determining a fluid quantity relating to a fluid and/or a fluid flow. The fluid in this case is conveyed through an internal space 4 of a measuring tube 3 in a direction shown by an arrow 7. In order to determine the fluid quantity, in particular a flow volume, a time-of-flight difference between times of flight from a first oscillation transducer 5 to a second oscillation transducer 6, and vice versa, may be determined by a control device 2, with which a time of flight of an ultrasound signal through the fluid conveyed in the internal space 4 is evaluated. In this case, use is made of the fact that this time of flight depends on a velocity component of the fluid parallel to a propagation direction of an ultrasound beam 8 through the fluid. It is therefore possible to determine, from this time of flight, a fluid velocity, averaged over the path of the respective ultrasound beam 8, in the direction of the respective ultrasound beam 8, and therefore approximately an averaged flow velocity in the volume through which the ultrasound beams 8 pass.

In an ideal measuring device, the time-of-flight difference when interchanging the emitting and receiving oscillation transducers 5, 6 would be zero when the fluid is at rest in the internal space, i.e. the flow velocity is equal to zero. In a real measuring device 1, however, so-called zero-flow errors occur because of component tolerances and ageing processes, that is to say even in the case of a zero flow velocity of the fluid a time-of-flight difference will be determined for the signal transport through the fluid. Zero-flow errors occurring because of component tolerances may be compensated for by determining a correction parameter for the time-of-flight difference, or the flow, for example in the scope of the production of the measuring device 1, and storing the correction parameter in the control device 2. Since a corresponding error may be temperature-dependent, the temperature of at least one component of the measuring device 1, or of the fluid, may be determined by using a temperature sensor 14, and this quantity may be taken into account when specifying the correction parameter.

The described approach is not, however, suitable for being able to detect errors occurring because of ageing of components. For this reason, if no further measures were implemented, highly ageing-resistant components would have to be used in the measuring device 1. Furthermore, replacement of the entire measuring device, or at least of the components relevant for these errors, would need to be carried out after a relatively short fixed time interval.

In order to avoid unnecessary servicing or replacement of the measuring device 1, the state of the measuring device 1 is monitored by the control device 2, particularly in relation to the zero-flow error. In this case, it would in principle be possible to determine the zero-flow error at times when no flow is expected, or when it is established by using further sensors that there is no flow. However, in order to obtain information about the existence or size of the zero-flow error independently of the flow, by using the control device 2 a first time of flight is recorded, after which an ultrasound signal which is excited by the first oscillation transducer 5, and is conducted only through components of the measuring device to the second oscillation transducer 6, is recorded at the second oscillation transducer. In this case, use is made of the fact that the oscillation transducer 5 excites waves which are conducted in a side wall 9 and which, as represented by an arrow 11, can be conducted directly through the side wall 9 to the oscillation transducer 6. Furthermore, a second time of flight, after which an ultrasound signal which is excited by the second oscillation transducer 6, and is conducted only through components of the measuring device to the first oscillation transducer 5, is recorded at the first oscillation transducer 5, is recorded. A time-of-flight difference between these two times of flight is a measure of the zero-flow error, since this time-of-flight difference is brought about by the same technical effects as a time-of-flight difference in the case of a zero flow for the ultrasound signal transmitted through the fluid.

The control device 2 subsequently evaluates a report condition, which depends on the time-of-flight difference of the ultrasound signal conducted only through the components of the measuring device and, if it is fulfilled, a report may be output to a user by using a reporting device 16, for example a display, and/or a report message may be sent to an external device 15, for example a mobile phone or a central device of a fluid supplier.

Preferably, the report condition is fulfilled when sudden or large changes in the time-of-flight difference are detected, which may in particular be caused by ageing effects of components of the measuring device 1 or defects. Such changes may, for example, be detected by checking whether the deviation between the time-of-flight difference and a predetermined reference value for the time-of-flight difference exceeds or reaches a predetermined deviation limit value. In this case, the predetermined reference value may depend on a temperature recorded by using the temperature sensor 14. For example, various temperature-dependent reference values may be determined by the manufacturer in the scope of a calibration of the measuring device, and stored in a memory of the control device 2.

As an alternative, the reference value may also be determined during ongoing operation and may in particular correspond to the time-of-flight difference for the ultrasound signal which is conducted only through components of the measuring device, as a preceding instant.

In one refinement of the method, it would also be possible to determine time-of-flight differences for this signal at a plurality of preceding instants, and for example to evaluate a chronological profile of the time-of-flight difference for this ultrasound signal for a particular time interval, for example over a few days, weeks or months, in order for example to identify characteristic profiles due to an ageing process or defect.

In addition or as an alternative to the reporting, or the sending of the report signal, it is also possible that, when the report condition is fulfilled, a correction parameter, which is used in the scope of determining the fluid quantity, is adapted. This correction parameter may in particular be added to the time-of-flight difference for the ultrasound signal conducted through the fluid, or subtracted therefrom, in order to compensate for influences of component tolerances or component ageing. The correction parameter may in particular be determined from the time-of-flight difference for the ultrasound signal conducted only through the components of the measuring device, or may correspond thereto.

The report condition may only be fulfillable, and/or the time-of-flight difference for the ultrasound signal conducted through the components of the measuring device may only be determined, when an additional condition is fulfilled. For example, it is possible to check whether a flow is recorded continuously over prolonged periods of time, in particular over prolonged periods of time during which no flow is expected, for example at night. This indicates either that there is a zero-flow error or that a fluid network to which the measuring device is connected is leaking. Evaluation of the time-of-flight difference for the ultrasound signal conducted through the components of the measuring device in this case makes it possible to distinguish between a leak and a zero-flow error, so that need-based output of reports, or sending of report messages, may be carried out.

The described method may, in particular, be implemented straightforwardly when the ultrasound signal conducted through the wall to the respective other ultrasound transducer 5, 6 and the ultrasound signal conducted through the fluid to the respective other ultrasound transducer 5, 6 are excited together. In the exemplary embodiment shown, the measurement of the fluid quantity is carried out with the aid of Lamb waves which are excited in the side wall 9 of the measuring tube 3. Such waves may, in particular, be excited when the thickness 10 of the side wall 9 is comparable to the wavelength of the transverse wave in the solid, which is given by the ratio of the speed of sound of the transverse wave in the solid and the excited frequency. Since both surfaces of the side wall 9 oscillate in the case of a Lamb wave, compression oscillations of the fluid are excited by the conducted wave, which are emitted into the fluid in the entire propagation path of the conducted wave. This is schematically represented by the ultrasound beams 8 mutually offset in the flow direction. The emitted ultrasound beams 8 are reflected at the opposite side wall 12 and conducted back through the fluid to the side wall 9. There, the incident ultrasound beams 8 again excite a conducted wave of the side wall 9, which can be detected by the oscillation transducer 6 in order to determine the time of flight. The propagation path of the ultrasound signal conducted through the fluid is dictated by the Rayleigh angle 13, which depends on the phase velocity of the Lamb wave in the side wall 9. At the same time, as is schematically represented by the arrow 11, the Lamb wave is conducted directly to the oscillation transducer 6. Since the two propagation paths shown have significantly different lengths and the propagation velocity in the fluid and in the tube wall differ, when using a moderately long excitation pulse or excitation of the conducted wave the ultrasound signals conducted through these propagation paths can be recorded in chronological succession by the oscillation transducer 6. The explained procedure may be used correspondingly for emission of the ultrasound signal by the oscillation transducer 6 and reception of the ultrasound signal by the oscillation transducer 5. In this way, it is possible to record the time-of-flight difference both for the wave conducted through the fluid and the other wave conducted through the side wall 9 with a single excitation signal. The described method can therefore be implemented particularly straightforwardly.

Figure 2:
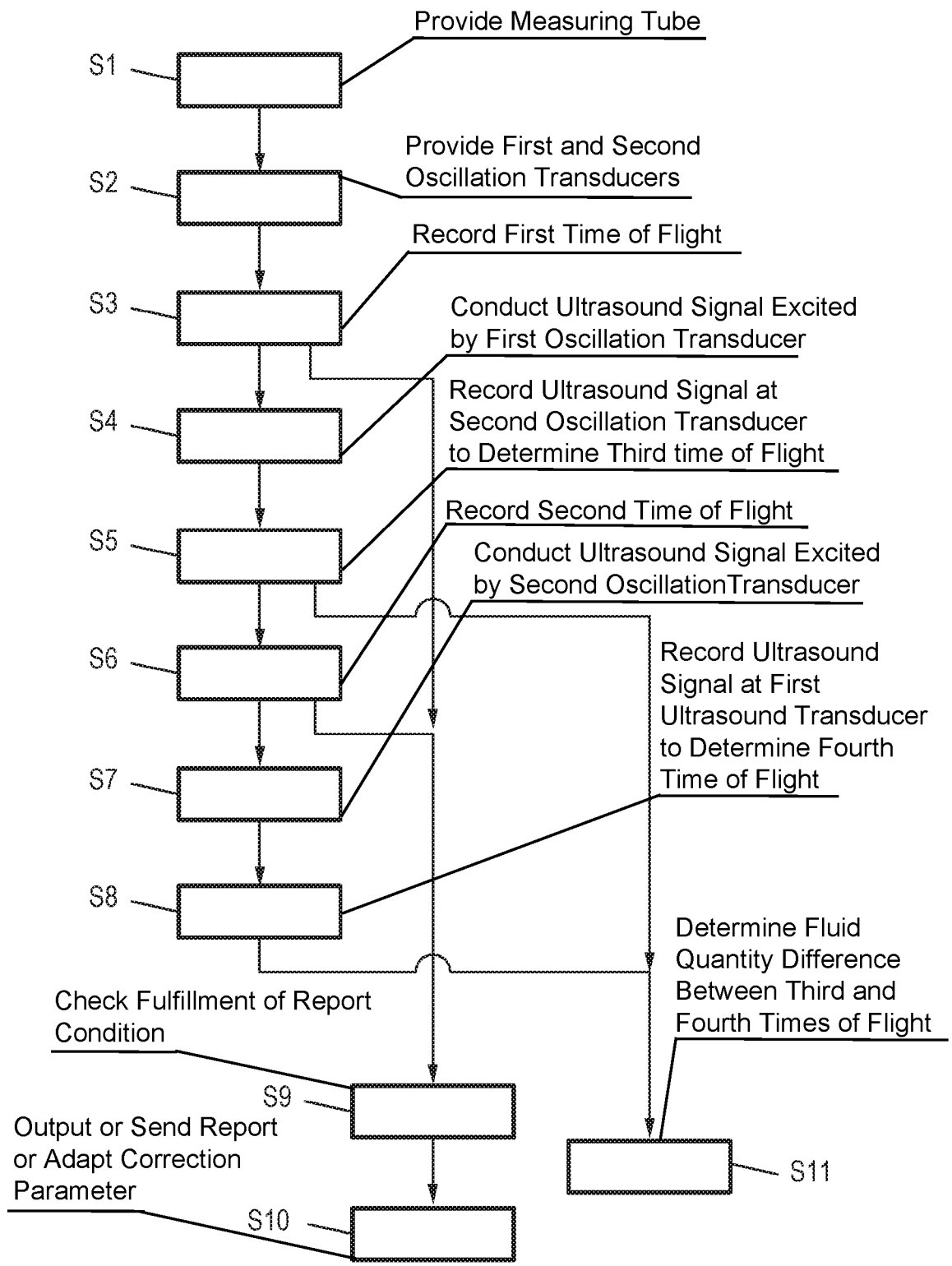
FIG. 2 is a flow chart of an exemplary embodiment of the method according to the invention.

FIG. 2 shows an embodiment of a method for operating a measuring device, the method including the following steps:

Providing a measuring tube at least one of receiving the fluid or conducting the fluid flow therethrough (S1);

Providing first and second oscillation transducers disposed at a distance from one another along the measuring tube and defining a propagation path therebetween including only components of the measuring device (S2);

Recording a first time of a flight after which an ultrasound signal excited by the first oscillation transducer, after being conducted along the propagation path to the second oscillation transducer, is recorded at the second oscillation transducer (S3);

Conducting the ultrasound signal, excited by the first oscillation transducer to determine the first time of flight, through the fluid to the second oscillation transducer (S4) and recording the ultrasound signal at the second oscillation transducer, to determine third time flight (S5);

Recording a second time of flight after which an ultrasound signal excited by the second oscillation transducer, after being conducted along the propagation path to the first oscillation transducer, is recorded at the first oscillation transducer (S6);

Conducting the ultrasound signal, excited by the second oscillation transducer to determine the second time of flight, through the fluid to the first oscillation transducer (S7) and recording the ultrasound signal at the first oscillation transducer, to determine a fourth time of flight (S8);

Subsequently checking for a fulfillment of a report condition, the fulfillment depending on a time-of-flight difference between the first and the second time of flight (S9);

Upon the report condition being fulfilled, at least one of outputting a report to a user or sending a report message to an external device or adapting at least one correction parameter used in determining the fluid quantity (S10); and Determining the fluid quantity as a function of the time-of-flight difference between the third and fourth times of flight (S11).

The following is a summary list of reference numerals and the corresponding structure used in the above description of the invention.

LIST OF REFERENCES 1 measuring device
2 control device
3 measuring tube
4 internal space
5 oscillation transducer
6 oscillation transducer
7 arrow
8 ultrasound beam
9 side wall
10 thickness
11 arrow
12 side wall
13 Rayleigh angle
14 temperature sensor
15 external device
16 reporting device

The invention claimed is:

1. A method for operating a measuring device, the measuring device serving the purpose of determining a fluid quantity relating to at least one of a fluid or a flow of the fluid, the method comprising the following steps:
   providing a measuring tube for at least one of receiving the fluid or conducting the fluid flow therethrough;
   providing first and second oscillation transducers disposed at a distance from one another along the measuring tube and defining a propagation path therebetween including only components of the measuring device;
   recording a first time of flight at the second oscillation transducer after an ultrasound signal excited by the first oscillation transducer is conducted along the propagation path to the second oscillation transducer;
   recording a second time of flight at the first oscillation transducer after an ultrasound signal excited by the second oscillation transducer is conducted along the propagation path to the first oscillation transducer;
   subsequently checking for a fulfillment of a report condition related to zero flow error, the fulfillment depending on a time-of-flight difference between the first and second times of flight; and
   upon the report condition being fulfilled, performing at least one of:
      outputting a report to a user or
      sending a report message to an external device or
      adapting at least one correction parameter used in determining the fluid quantity.

2. The method according to claim 1, which further comprises fulfilling the report condition or only permitting the report condition to be fulfilled when a deviation between the time-of-flight difference and a reference value for the time-of-flight difference exceeds or reaches a predetermined deviation limit value.

3. The method according to claim 2, which further comprises recording a temperature of at least one of the fluid or at least one component of the measuring device, and additionally making the fulfillment of the report condition dependent on the recorded temperature.

4. The method according to claim 3, which further comprises specifying the reference value as a function of the recorded temperature.

5. The method according to claim 1, which further comprises, repeatedly at time intervals:
   recording a respective first time of flight at the second oscillation transducer after an ultrasound signal excited by the first oscillation transducer is conducted along the propagation path to the second oscillation transducer;
   recording a respective second time of flight at the first oscillation transducer after an ultrasound signal excited by the second oscillation transducer is conducted along the propagation path to the first oscillation transducer;
   subsequently determining a respective time-of-flight difference between the respective first and second times of flight; and
   making the fulfillment of the report condition dependent on a plurality of the time-of-flight differences or on at least three of the time-of-flight differences.

6. The method according to claim 1, which further comprises:
   determining a third time of flight by additionally conducting the ultrasound signal, excited by the first oscillation transducer to determine the first time of flight, through the fluid to the second oscillation transducer and recording the ultrasound signal at the second oscillation transducer;
   determining a fourth time of flight by additionally conducting the ultrasound signal, excited by the second oscillation transducer to determine the second time of flight, through the fluid to the first oscillation transducer and recording the ultrasound signal at the first oscillation transducer; and
   determining the fluid quantity as a function of the time-of-flight difference between the third and fourth times of flight.

7. The method according to claim 1, which further comprises relating the fluid quantity to a flow rate of the fluid through the measuring tube, and at least one of only fulfilling the report condition or only determining the time-of-flight difference between the first and second times of flight, when the fluid quantity continuously exceeds a flow-rate limit value over at least one predetermined time interval.

8. The method according to claim 1, which further comprises:
   recording a third time of flight at the second oscillation transducer after an ultrasound signal excited by the first oscillation transducer is conducted through the fluid to the second oscillation transducer;
   recording a fourth time of flight at the first oscillation transducer after an ultrasound signal excited by the second oscillation transducer is conducted through the fluid to the first oscillation transducer; and
   determining the fluid quantity as a function of a corrected time-of-flight difference determined by adding the correction parameter from the first and second times of flight to the time-of-flight difference between the third and fourth times of flight or subtracting the correction parameter from the time-of-flight difference between the third and fourth times of flight.

9. The method according to claim 1, wherein, the ultrasound signal excited by the first oscillation transducer conducted along the propagation path to the second oscillation transducer comprises exciting a Lamb wave as the ultrasound signal conducted in a wall of the measuring tube for determination of the fluid quantity by at least one of the first or second oscillation transducers or separating at least one of the first or second oscillation transducers from the fluid by the wall of the measuring tube.

10. A measuring device for determining a fluid quantity relating to at least one of a fluid or a flow of the fluid, the measuring device comprising:
- a measuring tube for at least one of receiving the fluid or conducting the fluid flow therethrough;
- first and second oscillation transducers disposed at a distance from one another along said measuring tube and defining a propagation path therebetween including only components of the measuring device; and
- a control device for driving said first and second oscillation transducers and evaluating measurement data recorded by said first and second oscillation transducers, said control device being adapted for:
  - recording a first time of flight at said second oscillation transducer after an ultrasound signal excited by said first oscillation transducer is conducted along said propagation path to said second oscillation transducer;
  - recording a second time of flight at said first oscillation transducer after an ultrasound signal excited by said second oscillation transducer is conducted along said propagation path to said first oscillation transducer;
  - subsequently checking for a fulfillment of a report condition related to zero flow error, said fulfillment depending on a time-of-flight difference between said first and second times of flight; and
  - upon said report condition being fulfilled, performing at least one of:
    - outputting a report to a user or
    - sending a report message to an external device or
    - adapting at least one correction parameter used in determining the fluid quantity.

* * * * *